UNITED STATES PATENT OFFICE.

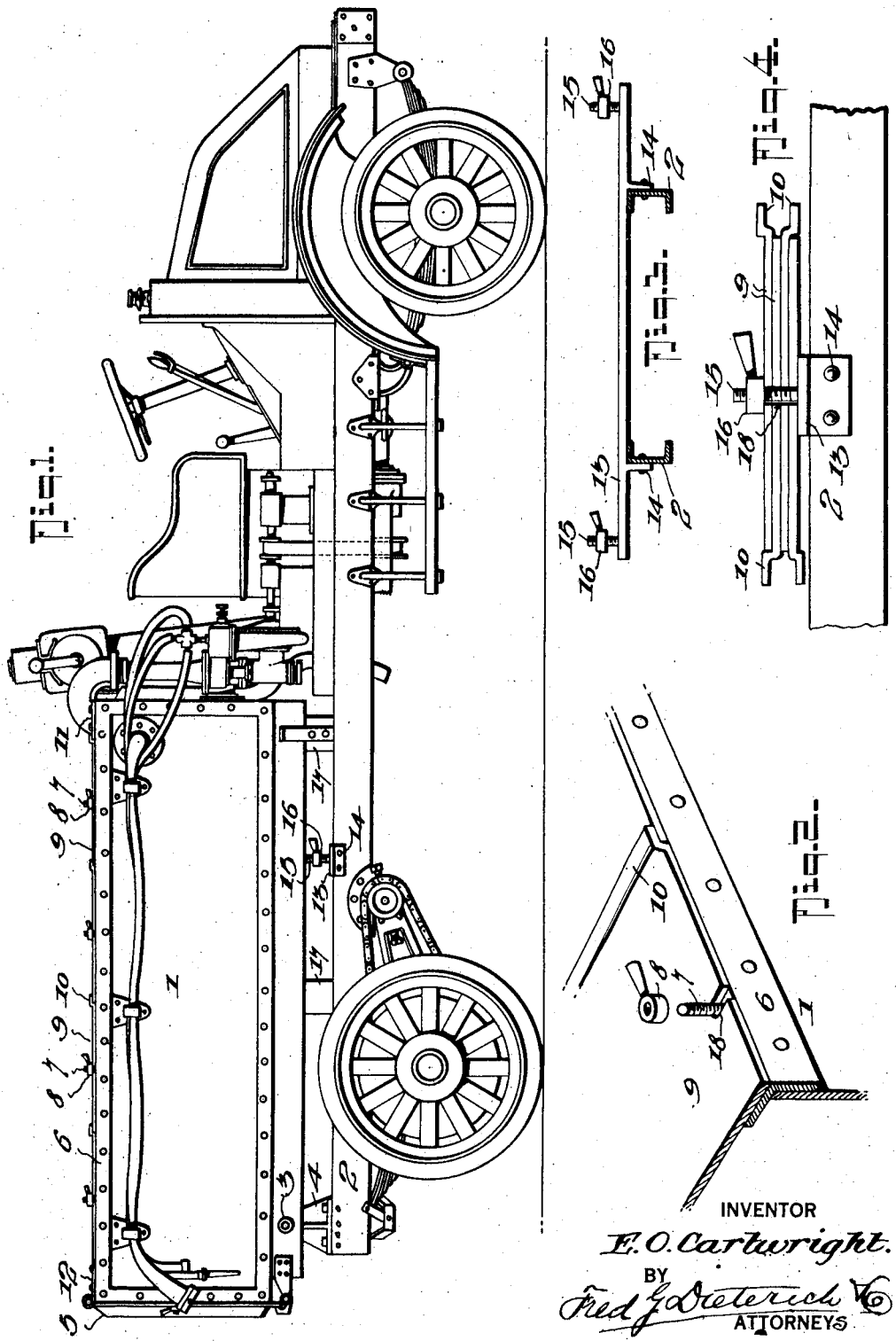

ERNEST O. CARTWRIGHT, OF SPRINGFIELD, OHIO, ASSIGNOR TO CHARLES F. GARDNER, OF SPRINGFIELD, OHIO.

TANK FOR PORTABLE PUMPING APPARATUS AND THE LIKE.

1,332,244.  Specification of Letters Patent.  Patented Mar. 2, 1920.

Application filed May 31, 1919. Serial No. 301,113.

*To all whom it may concern:*

Be it known that I, ERNEST O. CARTWRIGHT, a citizen of the United States, residing at Springfield, in the county of Clark and State of Ohio, have invented certain new and useful Improvements in Tanks for Portable Pumping Apparatus and the like, of which the following is a specification.

My invention relates to certain new and useful improvements in tank construction especially adapted for use on portable pumping apparatus such as is disclosed in my application filed October 25, 1918, Serial No. 259,668.

The present invention has for its object to provide a construction in which the settling tank has removable covers of such design and arrangement that they may be readily placed in position or removed from the tank and when not in use they may be stored on the vehicle frame beneath the tank out of the way and in such manner that they will not become lost.

In its more detailed nature, the invention includes those novel features of construction and arrangement of parts, all of which will be first fully described, then be specifically pointed out in the appended claims and illustrated in the accompanying drawings, in which:

Figure is a side elevation of a portable pumping apparatus embodying the invention.

Fig. 2 is a detail perspective view of a portion of the tank showing the manner of securing the cover plates in position.

Fig. 3 is a detail cross section of the chassis frame of the vehicle, showing the cross bar secured thereto and on which the cover plates are placed when not in use.

Fig. 4 is a detail elevation showing some of the cover plates placed on the cross bar over the chassis frame.

In the drawing, in which like numerals of reference indicate like parts in all of the figures, 1 represents the tank which, in the preferred embodiment of the invention, is pivoted at 3 to brackets 4 on the chassis frame 2 of the motor vehicle. The tank 1 is preferably made of metal and has a tail gate 5. The upper edge of the tank is provided with an angle iron 6 on the two sides which carries threaded studs 7 having nut members 8 by which the cover plates 9 are clamped over the top of the tank, the plates 9 having offset portions 10 to overlap adjacent plates and form a substantial closure for the top of the tank. At the front end, the tank is provided with a fixed cross plate 11 and a similar fixed cross plate 12 is provided a the rear of the tank.

13 is a cross bar which is secured at 14 to the chassis frame 2 and lies about midway between the transverse bolsters 17—17 that hold the forward end of the tank spaced upon the chassis frame a sufficient distance to provide a space in which the cover plates 9 may be stacked when not in use. Each cover plate 9 is slotted as at 18 to fit over the studs 7 when the cover is on the tank or to fit over corresponding studs 15 on the cross bars 13 to which cross bars the plates may be held by clamps 16 similar to the clamps 8. When all the plates are in place they will fill the space between the chassis frame 2 and the tank 1 and be held down against displacement by the tank body itself.

In the present application, I make no claim to the pumping apparatus or the combination of the tank with the said pumping apparatus as that constitutes a part of the subject matter of my original application above referred to.

While I have illustrated the preferred embodiment of the present invention, it is obvious that changes in the details of construction, design and configuration of the parts may be made without departing from the spirit of the invention or the scope of the appended claims.

What I claim is:

1. In apparatus of the class described, a supporting frame, a tank pivoted to said frame, said tank including removable cover plates, means for retaining said cover plates in stacked relation between said support and the tank when the cover plates are not in use on the tank.

2. A support, a tank pivoted to and spaced above said support, transverse bolsters across said support for spacing said tank therefrom and providing a space for the storage of cover plates, a transverse bar secured to said support at said space, and means on said transverse bar for restraining the cover plates against lateral movement.

3. In apparatus of the class described, a tank comprising a body having an inturned upper edge provided with a series of upwardly projecting clamp studs, clamp members carried by said studs, cover plates lying across said body on said inturned edge and removably engaging with said studs whereby said studs will restrain said cover plates against longitudinal and transverse movement.

4. A tank comprising a body provided at its upper edge with inwardly extended angle irons to form a cover plate seat, threaded clamp studs projected from said seat, clamp nuts on said studs, cover plates held on said seats and provided with slots to fit over said studs, said tank having fixed transverse end plates at the front and rear to coöperate with said cover plates in effecting a closure of the top of the tank.

5. In a portable pumping apparatus in which is included a supporting vehicle, a tank, cover plate sections for the tank top, a series of stud clamp devices along the tank top edges, said cover plate sections having end notches for slipping over the clamp studs, a supporting cross member on the vehicle, a clamp receiving stud at each end thereof, the said studs being adapted to receive the notched ends of the cover plates when stored upon the supporting cross member, substantially as shown and for the purpose described.

ERNEST O. CARTWRIGHT.